March 18, 1969 H. L. LIEBEL 3,433,354
RESILIENT ANGLE MEMBER
Filed Jan. 29, 1968
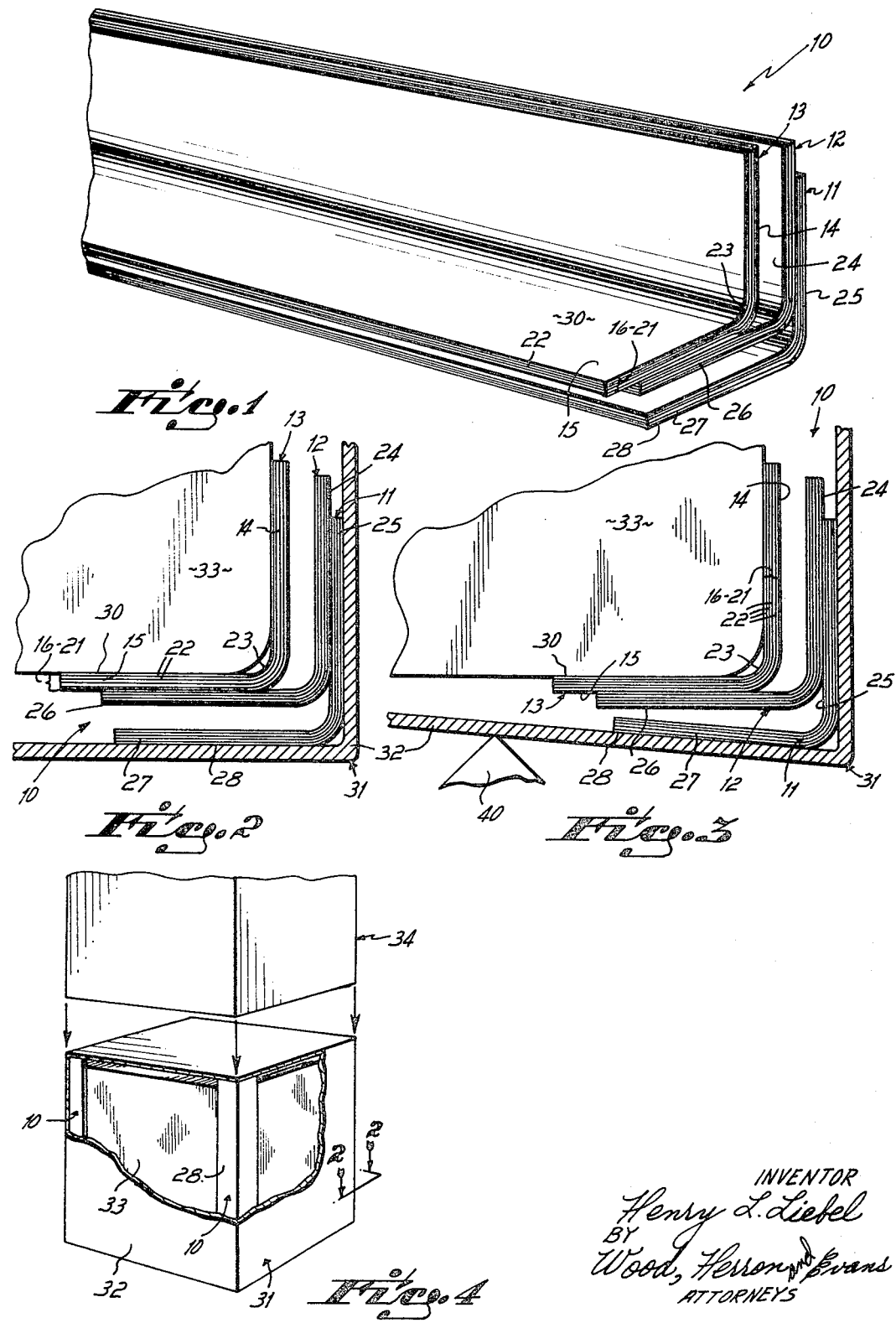
Fig. 2
Fig. 3
Fig. 4
INVENTOR
Henry L. Liebel
BY
Wood, Herron and Evans
ATTORNEYS United States Patent Office 3,433,354

Patented Mar. 18, 1969

3,433,354
RESILIENT ANGLE MEMBER

Henry L. Liebel, Cincinnati, Ohio, assignor to Paper Extrusions Co., Cincinnati, Ohio, a corporation of Ohio Filed Jan. 29, 1968, Ser. No. 701,166
U.S. Cl. 206—46 6 Claims
Int. Cl. B65d 57/00, 85/30, 5/50

ABSTRACT OF THE DISCLOSURE

A resilient angle member for use in packaging; for example, to form the corner posts of a container. The composite angle member comprises three rigid angle elements which are nested together. Each angle element comprises a series of plies of paper glued together and bent into an angular configuration. One arm of the center angle element is glued to the corresponding arm of the outer angle element with the other two arms of these elements being spaced from one another. The second arm of the center angle element is glued to the corresponding arm of the innermost angle element with the second arm of the innermost angle element being spaced from the corresponding arm of the center angle element. The angle elements are rigid in a longitudinal direction and are resilient in a transverse direction so that as one of the arms is deflected, it tends to return to its original position. The angle member functions as a corner protector, to provide stacking strength, to space the contents from the walls of the package, and as a shock absorber.

*Background of the invention*

This invention relates to the art of packaging and is particularly directed to a resilient angle member useful as an insert in containers.

It is conventional to ship many articles, such as appliances, furniture, automotive parts and the like, in corrugated boxes and similar containers. The corrugated paper container does not in itself have any appreciable strength. Accordingly, it is desirable to provide insert members to give support when containers are stacked above one another. It is also desirable, and indeed is required by current shipping regulations, to provide some means for maintaining spacing between the appliance or other article being shipped and the side walls of the container. The purpose of this, of course, is to minimize the chance of damage to the article being shipped by a blow against the container side walls.

The principal object of the present invention is to provide a novel, resilient angle member which is effective to sustain stacking loads and is also effective to act as a spacer between the container walls and article being shipped.

It is a further object of the present invention to provide an angle member which is rigid in its longitudinal direction and is resiliently deformable in a transverse direction so that the angle member is effective to both protect the corner of an appliance or other article and is effective to cushion a sideways blow directed against a wall of the container.

It is a further object of the present invention to provide a resilient angle member which can be produced economically from scrap paper, such as side rolls or the like.

More particularly, the present resilient angle member is a composite member formed from three angle elements. Each angle element in turn is formed from a plurality of laminated sheets of paper which are glued together and are bent to form two angulated arms prior to the time the glue is set. As a result, the angle elements have no line of weakening and the arms are resilient when they are displaced relative to one another, i.e., they tend to return to their original angulated position relative to one another. Moreover, the angle element is rigid in its longitudinal direction and in fact a typical angle element is effective to withstand a longitudinal compressive load of 1000 lbs.

The present angle member comprises at least three such angle elements. These angle elements are nested together with their respective walls parallel to one another. One wall of the center angle element abuts and is secured to the corresponding wall of the outer angle element. The second walls of each of these elements are spaced from one another. The second wall of the center element is similarly secured to the corresponding wall of the inner angle element with the opposite walls of these latter two elements being spaced from one another.

As a result of this configuration, the total spacing between the outer wall of the outer element and the corresponding inner wall of the innermost element is appreciably greater than the total thickness of the three corresponding walls. Thus, the angle member is effective when placed in a corner of a container to secure an appreciable spacing between the appliance or other contents of the container and the container wall. The angle member is effective to carry a high stacking load to protect the contents from damage when containers are stacked above one another. Also, since the arms of the angle members are resiliently bendable in a transverse direction, the angle member is effective to protect the corners of appliances and to act as a shock absorber against blows directed at the side walls of the container.

These and other objects and advantages of the present invention will be more readily apparent from a further consideration of the following detailed description of the drawings illustrating a preferred embodiment of the invention.

In the drawings:

FIGURE 1 is a perspective view of one preferred form of angle member constructed in accordance with this invention.

FIGURE 2 is a cross sectional view through the corner of a container fitted with the present angle member, the sectional view being taken along line 2—2 of FIGURE 4.

FIGURE 3 is a cross section view similar to FIGURE 2 showing the manner in which the angle member is resiliently deformed by a blow against the wall of the container.

FIGURE 4 is a perspective view partially broken away showing the manner in which the present angle members are inserted in a container.

One preferred form of angle member 10 embodying the principles of the present invention is best shown in FIGURE 1. As there shown, the angle member 10 is a composite member comprised by the assembly of three angle elements 11, 12 and 13. Each of the angle elements 11, 12 and 13 is substantially identical with one another; therefore, only angle element 13 will be described in detail.

More particularly, angle element 13 comprises two rigid arms 14 and 15 formed integral with one another and disposed at an angle relative to one another. In a preferred embodiment, arms 14 and 15 are disposed at right angles to one another; although it is to be understood that the arms may be disposed at a different angle, either acute or obtuse, if desired for any particular application.

Angle element 13 comprises a plurality of superposed sheets 16–21. These sheets are joined together by adhesive layers 22 which preferably cover the entire facial surface contact area between adjacent sheets. While the exact material comprising the paper sheets is not critical, for economical reasons the sheets are preferably of a type available as side rolls trimmed from the edges of paper stock as part of the normal manufacturing procedure. Two particularly suitable types of paper are kraft paper and chip board paper. Again, the thickness of the sheet is not critical. However, a thickness of from ten to thirty points is preferred. Again, the exact nature of the adhesive securing sheets 16–21 together is not critical, suitable adhesives being a silica gel, glue, starch glue, or phenolic glue.

It is to be understood that the sheets 16–21 are not scored or otherwise weakened in the apex area 23. Rather, the sheets are coated with glue while the sheets are in a planar condition and are then folded into the angular configuration prior to the time the glue is set. While the exact method of production of the angle elements 11–13 does not constitute part of the present invention, one generally suitable method for forming these angle elements is shown in Forsell Patent No. 2,764,219 for "Machine for Making Laminated Angular Corner Protectors."

While the exact dimensions of the finished angle members are not critical, I have determined that one preferred size of angle member includes arms which are approximately 2" to 3" wide with the thickness of the arms being between .200" and .250". Angle elements comprising from six to ten laminated sheets are preferred for most applications; however, it is contemplated that other angle members can be formed of from four to twenty laminations. The angle members are cut to any desired length from a few inches to several feet.

The characteristics of the completely fabricated angle elements 11–13 are that the elements are relatively rigid, particularly with regard to longitudinal pressure; for example, one typical angle element is adapted to withstand a longitudinal compressive load in excess of 1000 lbs. The angle elements resist bending of the arms 14 and 15 relative to one another and are resilient so that when the arms are bent by application of a load, they tend to spring back to their original position.

The composite angle member 10 is formed by nesting three angle elements 11–13 with their respective arms disposed in parallel relationship. One arm 24 of the center angle element 12 abuts and is adhesively secured to the corresponding arm 25 of the outer angle element 11. As is best shown in FIGURES 1 and 2, the center angle element 12 is displaced slightly from angle element 11 in a plane parallel to arm 24 so that the second arm 26 of angle element 12 is spaced slightly from the corresponding arm 27 of outermost angle element 11.

The second arm 26 of angle element 12 is in turn adhesively secured to the corresponding arm 15 of inner angle member 13. Angle element 13 is offset from angle element 12 in a plane parallel to arm 26 so that arm 14 of angle element 13 is spaced from the corresponding arm 24 of angle element 12. The exact spacing between arms 26 and 27 and arms 14 and 24 is not critical. However, for many applications it is preferred to have the transverse dimension from the outer surface 28 of one arm of outer angle element 11 to the inner surface 30 of inner angle element 13 at least equal to ¾".

A typical use for resilient angle member 10 of the present invention is best shown in FIGURES 2, 3 and 4. As there shown, the angle members 10 are used for corner protectors and spacers in a package 31. The package includes an outer, rectangular box 32 of conventional construction; for example, corrugated board. The box is used to enclose an article 33, such as an appliance, for shipment. A resilient angle member 10 is inserted in each vertical corner of container 32 between the walls of the container and appliance 33.

The corner members perform four functions. In the first place, they sustain the vertical load when one or more packages, such as package 34, are stacked on top of package 31 (FIGURE 4). In the second place, the resilient angle members function as corner protectors to protect the corners of the appliance from damage during handling. In the third place, the resilient angle members function to maintain a predetermined spacing, for example ¾", between the walls of the container 31 and the adjacent walls of the appliance 33.

Finally, the resilient angle member functions as a shock absorber. This function is best shown in FIGURES 2 and 3. FIGURE 2 shows the normal position of the walls of the container 31 with the appliance or other article 33 being spaced from the walls and being held in position by the inner angle element 13. FIGURE 3 shows the effect of an external blow as caused by object 40 pressing against one wall of container 31. When this happens, arm 27 of angle element 11 is bent inwardly. However, this arm resists inward movement and absorbs the shock of the blow. Moreover, when the object 40 is disengaged from the wall of container 31, the inherent resiliency of angle element 11 will cause arm 27 to swing outwardly and return to its normal positon shown in FIGURE 2, whereby the normal spacing between the wall of the container and appliance 33 is preserved.

From the foregoing disclosure of the general principles of the present invention and the above detailed description of a preferred embodiment, those skilled in the art will readily comprehend various modifications to which the present invention is susceptible. By way of example, it is contemplated that additional angle elements can be utilized if desired for some particular application. For example, a fourth angle element could be secured to angle element 13 in the same manner in which angle element 12 is joined to angle element 11. Moreover, as was pointed out previously, while for most applications it is desirable that the arms of each angle element form approximately a 90° angle, it is contemplated that for special applications the angle elements can be formed with other angles between their arms.

Having described my invention, I claim:

1. As a new article of manufacture, a resilient angle member comprising first, second and third rigid angle elements, each angle element comprising a plurality of superposed sheets of paper, a layer of glue intermediate adjacent sheets, said sheets of paper being bent to form an apex and first and second arms angulated relative to one another, said angle elements being nested relative to one another with their respective arms extending parallel to one another and with the second angle element being disposed intermediate the first and third angle elements, the first angle element being outermost, the first arm of the second angle element being in abutment with and secured to the first arm of the first angle element, the second arm of the second angle element being spaced from the second arm of the first angle element, the second arm of the second angle element being in abutment with and secured to the second arm of the third angle element, the first arm of the third angle element being spaced from the first arm of the second angle element.

2. The angle member of claim 1 in which the arms of each angle element form a substantially right angle.

3. The angle member of claim 2 in which the abutting arms of adjacent angle elements are secured together by gluing.

4. A package comprising a container having side walls meeting at corners, said container being adapted to ship an article of smaller transverse dimensions than the corresponding internal dimensions of said container, a resilient angle member disposed in each of the corners of said container intermediate the walls of the container and the article being packaged, each said angle member comprising first, second and third rigid angle elements, each angle element comprising a plurality of superposed sheets of paper, a layer of glue intermediate adjacent sheets, said sheets of paper being bent to form an apex and first and second arms angulated relative to one another, said angle elements being nested relative to one another with their respective arms extending parallel to one another and with the second angle element being disposed intermediate the first and third angle elements, the first angle element being outermost, the first arm of the second angle element being in abutment with and secured to the first arm of the first angle element, the second arm of the second angle element being spaced from the second arm of the first angle element, the second arm of the second angle element being in abutment with and secured to the second arm of the third angle element, the first arm of the third angle element being spaced from the first arm of the second angle element.

5. The container of claim 1 in which the arms of the first angle element abutting the walls of said container and the arms of the second angle element abutting the article space said article from the adjacent walls of said container.

6. The container of claim 1 in which the angle member is as high as the walls of said container and is thereby effective to provide stacking strength.

References Cited

UNITED STATES PATENTS

| | | | |
|---|---|---|---|
| 2,674,433 | 4/1954 | Mautner | 206—46 |
| 2,950,038 | 8/1960 | Rupp | 229—14 |
| 2,965,371 | 12/1960 | Gulardo | 206—46 |

WILLIAM T. DIXSON, Jr., *Primary Examiner.*

U.S. Cl. X.R.

206—62; 229—14